United States Patent [19]
Murphy et al.

[11] Patent Number: 5,094,008
[45] Date of Patent: Mar. 10, 1992

[54] VARIABLE LENGTH DIPSTICK

[75] Inventors: Michael A. Murphy, Owosso; James M. Schott, Durand, both of Mich.

[73] Assignee: General Motors Corporation, Detroit, Mich.

[21] Appl. No.: 756,716

[22] Filed: Sep. 9, 1991

[51] Int. Cl.⁵ .............................................. G01F 23/04
[52] U.S. Cl. ..................................................... 33/723
[58] Field of Search ................. 33/722, 723, 724, 725, 33/726, 727, 728, 729, 730, 731

[56] References Cited

U.S. PATENT DOCUMENTS

| | | |
|---|---|---|
| 1,981,270 | 11/1934 | Hollingsworth . |
| 2,254,662 | 9/1941 | Naples et al. . |
| 2,738,587 | 3/1956 | Nelson . |
| 2,849,796 | 9/1958 | Eshbaugh . |
| 3,274,691 | 9/1966 | Bolles . |

Primary Examiner—Harry N. Haroian
Attorney, Agent, or Firm—Donald F. Scherer

[57] ABSTRACT

A variable length dipstick provides fluid level indications by contacting a stop within the sump. The dipstick is removably disposed within a guide tube. The dipstick has an upper element with a handle and a seal which contact the guide tube on insertion of the dipstick into the guide tube. A lower element is slidably engaged with the upper element. The lower element has marks to indicate the appropriate fill level. A spring is functionally disposed between the upper element and the lower element, tending to keep the dipstick extended to its full length. The resultant dipstick spring load produced by insertion and sealing of the dipstick is sufficiently low so as not to overcome the seal between the seal and the guide tube.

4 Claims, 2 Drawing Sheets

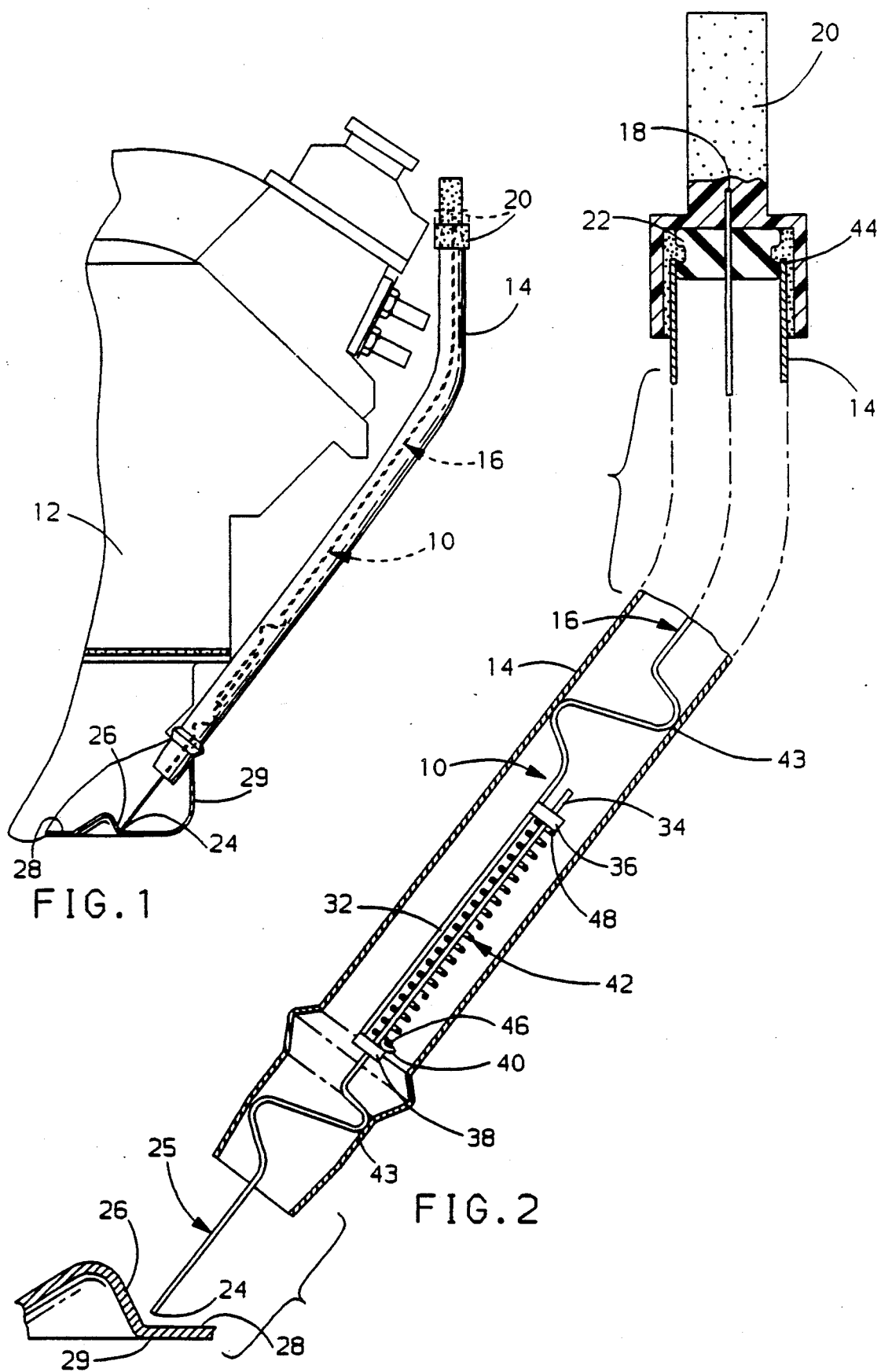

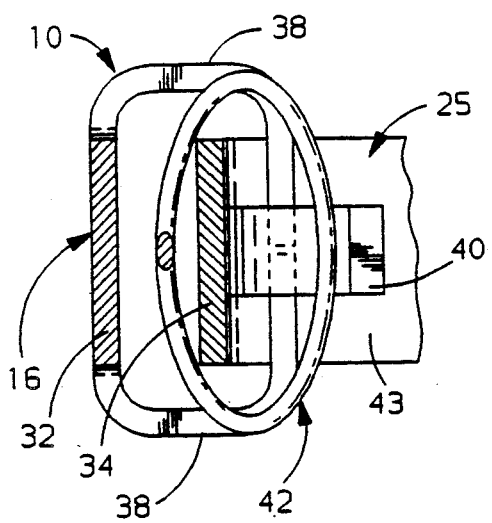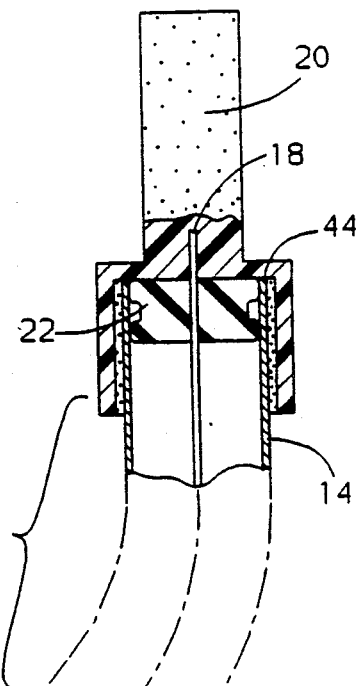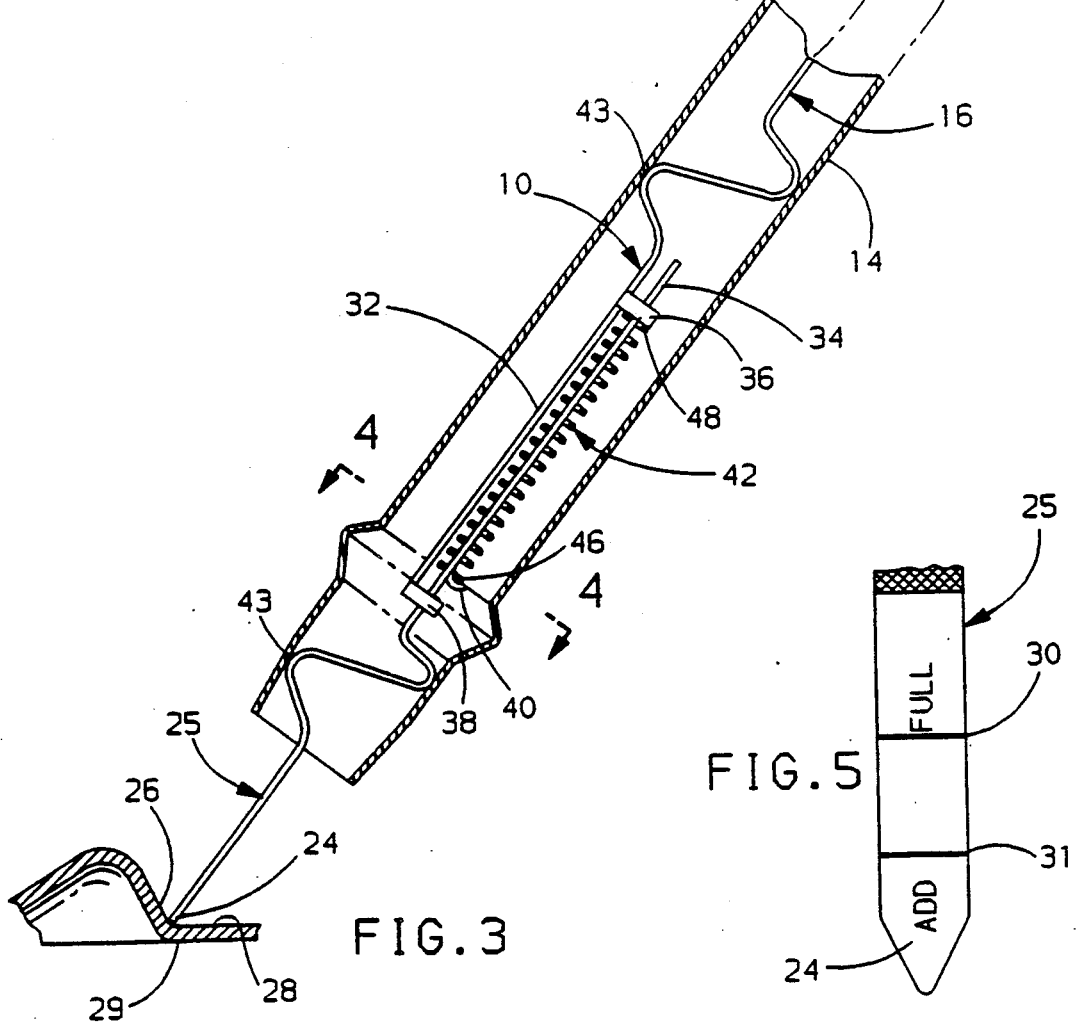

VARIABLE LENGTH DIPSTICK

TECHNICAL FIELD

This invention relates to dipsticks used to measure fluid levels, particularly the level of oil in motor vehicle engines and transmissions.

BACKGROUND OF THE INVENTION

Dipsticks for checking the level of engine oil and transmission oil in motor vehicles are most typically a single narrow strip of steel with a distal end and a proximate end. The distal end is immersed in the fluid whose level is being checked. The proximate end has a handle by which the dipstick is inserted into and removed from a fluid sump, and a seal which prevents fluid from splashing out of the tube and provides a retaining force for the dipstick. The dipsticks are removably disposed within a guide tube. A top of the guide tube serves as a stop for the dipstick, limiting the travel of the dipstick into the fluid sump.

The distal end has marks indicating a full level and a level at which more oil needs to be added. The distal end extends into the fluid without contacting any positive stop. Locations of the marks are dependent on the nominal values of the length of the guide tube, the relative location of the guide tube to the engine or transmission case with which the guide tube is associated, and the relative location of the case to an oil sump screen. Any variations of these values from their nominal values can produce dipstick readings which do not accurately reflect the true fluid level relative to the sump screen position. The effect of guide tube length variation, dipstick length variation, and guide tube positioning variation on the dipstick are cumulative, causing the positioning relationship between the dipstick and the surface of the oil to be subject to a greater amount of variation than the positioning relationship between the sump screen and the surface of the oil.

One approach to minimizing the potential for variation between the dipstick location and the surface of the oil is to have the position of the distal end of the dipstick controlled by an indicator stop in the oil sump. This eliminates the cumulative variation of the guide tube length variation, the dipstick length variation, and the guide tube positioning variation, and substitutes the variation in distance between the stop and the case. The substitution of one source of error for three reduces the total expected variation.

The use of a stop in the oil sump requires the dipstick to deflect in the axial direction to allow the dipstick handle to be seated. A dipstick designed to flex axially so as to accommodate seating of the dipstick handle is currently employed by the assignee of this invention in production transmissions. The dipstick is formed of spring steel, allowing the dipstick to deflect axially by bowing inside the guide tube as the handle is seated after the dipstick has contacted the stop. Because of the potential for cumulative variation between the stop and the top of the guide tube, the deflection needed in the dipstick to seat the handle may produce forces sufficient to push the handle and seal away from the guide tube.

Providing a dipstick with a sufficiently low axial stiffness can potentially require making the dipstick longer, aggravating underhood packaging difficulties, as well as potentially making insertion and removal of the dipstick more difficult. Also, producing a very low axial stiffness by either making the dipstick either very long or very thin can result in the dipstick being subject to buckling on insertion.

SUMMARY OF THE INVENTION

This invention represents an improvement over the presently known dipsticks which measure fluid levels by contacting an immersed indicator stop in that it provides a dipstick which has a relatively low axial stiffness yet is easy to manipulate. The dipstick is split into an upper element and a lower element which are slidably engaged with one another. A spring is functionally interposed between the two elements.

It is an object of this invention to provide a dipstick for measuring fluid levels in a motor vehicle, disposed in a guide tube, having an upper element, a lower element which contacts a stop, and a spring interposed between the upper element and lower element which tends to keep the dipstick extended to its maximum length.

This and other objects of the invention will be more apparent from the following description and drawings.

DESCRIPTION OF THE DRAWINGS

FIG. 1 shows a variable length dipstick extending into an engine oil pan.

FIG. 2 shows a variable length dipstick with a handle and a seal not fully seated.

FIG. 3 shows a variable length dipstick with a handle and a seal fully seated.

FIG. 4 shows a view in direction 4 of the dipstick assembly shown in FIG. 3.

FIG. 5 shows a lower element distal end of a dipstick.

DESCRIPTION OF THE PREFERRED EMBODIMENT

A dipstick 10 is shown in FIG. 1 in its installed position in an automobile engine 12 for measuring engine oil levels. The dipstick 10 is removably disposed within a guide tube 14. FIG. 2 and FIG. 3 show the dipstick 10 more clearly. An upper element 16 has an upper element proximate end 18 with means for removal of the dipstick from the guide tube 14, or a handle 20. The upper element proximate end 18 also has a seal 22 which both restricts the exit of fluid from the guide tube 14 and provides a seal force against the guide tube 14 which resists removal of the dipstick 10 from the guide tube 14. When the dipstick 10 is fully inserted in the guide tube 14, a lower element distal end 24 of a lower element 25 contacts a stop 26 in a bottom 28 of an oil pan sump 29. The lower element distal end 24 has a full level mark 30 and an add mark 31 indicating that fluid needs to be added.

An upper element distal end 32 slidably engages a lower element proximate end 34. Upper wrap-around tabs 36 and lower wrap-around tabs 38 of the upper element distal end 32 encircle the lower element proximal end 34, restricting the relative motion between the upper element 16 and the lower element 25 to axial motion. A U-shaped tab 40 in the lower element 25 located between the upper 34 and lower wrap-around tabs 38 restricts axial displacement between the upper element 16 and the lower element 25, preventing the separation of the upper element 16 from the lower element 25. An oval spring 42 is shown in section, interposed between the upper element 16 and the lower element 25. The spring 42 tends to keep the dipstick 10 extended to a maximum length, as shown in FIG. 2.

When the dipstick 10 is fully extended, the U-shaped tab 40 contacts the lower wrap around tab 38.

There are S-bends 43 in the dipstick 10, both in the upper element 16 proximate to the upper wrap-around tabs 36 and in lower element 25 distal to the lower tabs 38 of the upper element 16. The bends 43 aid in centering the dipstick 10 relative to the guide tube 14. This minimizes contact of the spring 42 and the engaging portions of the upper and lower elements 16 and 25, and the lower element distal end 24. This facilitates insertion and removal of the dipstick 10 as well as reading the dipstick 10.

The dipstick 10 has a maximum length, or a free length, greater than an arc distance inside the guide tube 14 between a guide tube top 44 and the stop 26. When the handle 20 and seal 22 are fully seated against the guide tube top 44 in FIG. 3, the lower element distal end 24 abuts the stop 26. In fully seating the handle 20 and seal 22 after the lower element distal end 24 contacts the stop 26, the upper element 16 is displaced relative to the lower element 25, compressing the spring 42. The spring 42 compensates for expected variations of the arc distance inside the guide tube between the guide tube top 44 and the stop 26 without developing force sufficient to unseat the handle and seal from the guide tube top 44.

The oval spring 42 is shown wrapped around the lower element 25 in FIG. 4. The spring 42 could alternatively be wrapped around the upper element 16, changing the location of the tabs 36, 38, 40 to accommodate this. A distal end 46 of the spring 42 moves axially with the U-shaped tab 40 of the lower element 25 between the upper 36 and lower wrap around tabs 38. A proximate end 48 of the spring 42 travels with the upper wrap around tabs 36 of the upper element 16.

Obviously, many modifications and variations of the present invention are possible in light of the above teaching. It is therefore to be understood, that within the scope of the appended claims, the invention may be practices otherwise than as specifically described.

The embodiments of the invention in which an exclusive property or privilege is claimed are defined as follows:

1. A dipstick for measuring fluid levels in a motor vehicle, removably disposed within a guide tube, comprising:

an upper element having an upper element proximate end and an upper element distal end, the upper element proximate end with means for removal of the dipstick from the guide tube;

a lower element having a lower element proximate end and a lower element distal end, the lower element distal end abutting a stop when the dipstick is fully inserted in the guide tube and the lower element proximate end slidably engaging the upper element distal end; and a spring interposed between the upper element and the lower element, tending to keep the dipstick extended to a maximum length.

2. A dipstick for measuring fluid levels in a fluid sump in a motor vehicle, removably disposed within a guide tube, comprising:

an upper element having an upper element proximate end and a lower element distal end, the upper element proximate end with means for removal of the dipstick from the guide tube;

a lower element having a lower element distal end and a lower element proximate end, the lower element proximate end slidably engaged with an upper element distal end, the lower element distal end with marks to indicate a full level and an add level;

a spring interposed between the upper element and the lower element, tending to keep the dipstick extended to its maximum length; and a stop within the fluid sump which limits the travel of the lower element distal end when the dipstick is fully inserted in the guide tube.

3. A dipstick for measuring fluid levels in a fluid sump in a motor vehicle, removably disposed within a guide tube, comprising:

an upper element having an upper element proximate end and an upper element distal end, the upper element proximate end with means for removal of the dipstick from the guide tube, the upper element proximate end having a seal which seals against the guide tube providing a seal force which resists removal of the dipstick from the guide tube;

a lower element having a lower element proximate end and a lower element distal end, the lower element proximate end slidably engaged with the upper element distal end, the lower element distal end with marks to indicate a full level and an add level and with means limiting the slidable displacement of the lower element relative to the upper element;

a spring interposed between the upper element and the lower element, tending to keep the dipstick extended to its maximum length, producing a maximum load on full insertion of the dipstick into the guide tube which is less than the seal force; and a stop in the sump, limiting the travel of a distal end of the lower element when the dipstick is fully inserted in the guide tube.

4. A dipstick for measuring fluid levels in a fluid sump in a motor vehicle, removably disposed within a guide tube, as claimed in claim 3, further comprising:

means of slidable engagement between the lower element and the upper element being provided by lower wrap-around tabs and upper wrap-around tabs, extending from the upper element and encircling the lower element;

means of limiting slidable displacement of the lower element relative to the upper element provided by a U-shaped tab in the lower element located between the wrap-around tabs of the upper element after engagement with the upper element; and an S-bend in the upper element proximate to the upper wrap-around tabs, and an S-bend in the lower element distal to the lower wrap-around tabs of the upper element.

* * * * *